US011685495B1

(12) United States Patent
Smith et al.

(10) Patent No.: US 11,685,495 B1
(45) Date of Patent: *Jun. 27, 2023

(54) SYSTEMS AND METHODS FOR SUSPENDING A LUBRICANT IN A MARINE PROPULSION DEVICE

(71) Applicant: Brunswick Corporation, Mettawa, IL (US)

(72) Inventors: Joshua S. Smith, Mayville, WI (US); David J. Landowski, Fond du Lac, WI (US); David J. Waldvogel, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,841

(22) Filed: Dec. 28, 2021

Related U.S. Application Data

(63) Continuation of application No. 16/451,272, filed on Jun. 25, 2019, now Pat. No. 11,247,761.

(51) Int. Cl.
| | | |
|---|---|---|
| *B63H 20/00* | (2006.01) | |
| *F16H 57/04* | (2010.01) | |
| *B63H 20/32* | (2006.01) | |
| *B63H 20/14* | (2006.01) | |

(52) U.S. Cl.
CPC .......... *B63H 20/002* (2013.01); *B63H 20/14* (2013.01); *B63H 20/32* (2013.01); *F16H 57/045* (2013.01); *F16H 57/0436* (2013.01); *F16H 57/0441* (2013.01); *B63H 2020/323* (2013.01)

(58) Field of Classification Search
CPC ....... B63H 20/002; B63H 20/14; B63H 20/32
See application file for complete search history.

(56) References Cited

U.S. PATENT DOCUMENTS

| | | | | |
|---|---|---|---|---|
| 3,042,146 | A * | 7/1962 | Shimanckas | B63H 20/002 123/196 R |
| 5,009,621 | A * | 4/1991 | Bankstahl | B63H 5/10 416/129 |
| 5,791,950 | A * | 8/1998 | Weronke | F01N 13/12 440/75 |
| 8,460,041 | B2 * | 6/2013 | Davis | B63H 20/32 440/75 |
| 9,126,666 | B2 * | 9/2015 | Davis | F16H 57/031 |
| 9,840,316 | B1 * | 12/2017 | Jaszewski | B63H 20/002 |
| 9,919,783 | B1 * | 3/2018 | Tuchscherer | B63H 20/20 |
| 9,964,210 | B1 * | 5/2018 | Jaszewski | F16H 57/0484 |

(Continued)

*Primary Examiner* — S. Joseph Morano
*Assistant Examiner* — Jovon E Hayes
(74) *Attorney, Agent, or Firm* — Andrus Intellectual Property Law, LLP

(57) ABSTRACT

A system for suspending a lubricant in a marine propulsion device having a gearcase, the gearcase defining a gearset cavity for containing a propeller shaft gearset rotated by a driveshaft. The system includes a pump device configured to pump the lubricant away from the gearset cavity, and a reservoir located away from the gearset cavity and configured to receive the lubricant from the pump device. An input passage conveys the lubricant from the pump device to the reservoir, and an output passage conveys the lubricant from the reservoir to the gearset cavity. The reservoir is configured to retain a portion of the lubricant circulating between the gearset cavity and the reservoir.

20 Claims, 6 Drawing Sheets

(56) References Cited

U.S. PATENT DOCUMENTS

| | | | |
|---|---|---|---|
| 10,384,756 B2 * | 8/2019 | Davis | B63H 20/06 |
| 10,502,312 B1 * | 12/2019 | Jaszewski | F16H 57/045 |
| 10,549,833 B2 * | 2/2020 | Davis | B63H 20/02 |
| 11,059,554 B2 * | 7/2021 | Davis | B63H 20/32 |
| 2011/0195620 A1 * | 8/2011 | Davis | B63H 20/28 |
| | | | 440/75 |
| 2013/0273792 A1 * | 10/2013 | Davis | B63H 20/32 |
| | | | 440/75 |
| 2015/0367924 A1 * | 12/2015 | Davis | B63H 20/24 |
| | | | 440/53 |

* cited by examiner

SYSTEMS AND METHODS FOR SUSPENDING A LUBRICANT IN A MARINE PROPULSION DEVICE

CROSS REFERENCE TO RELATED APPLICATION

This application is a continuation of U.S. patent application Ser. No. 16/451,272, filed Jun. 25, 2019, which is incorporated herein by reference in its entirety.

FIELD

The present disclosure generally relates to systems and methods for suspending a lubricant in a marine propulsion device, and more particularly to systems and methods for suspending a lubricant in a marine propulsion device to minimize windage loss.

BACKGROUND

The following U.S. Patents and Patent Applications provide background information and are incorporated by reference in entirety.

U.S. patent application Ser. No. 16/171,490 discloses an outboard motor that has a powerhead that causes rotation of a driveshaft, a steering housing located below the powerhead, wherein the driveshaft extends from the powerhead into the steering housing; and a lower gearcase located below the steering housing and supporting a propeller shaft that is coupled to the driveshaft so that rotation of the driveshaft causes rotation of the propeller shaft. The lower gearcase is steerable about a steering axis with respect to the steering housing and powerhead.

U.S. Pat. No. 5,009,621 discloses counterrotating propeller drive mechanism for a marine propulsion system incorporates a torque splitting device which consists of a differential gear means and a ratio gear means. The torque splitting device assigns a selectable fixed fraction of the engine torque to each propeller regardless of power, thrust, and speed conditions. The rear one of the two propellers adjusts its rotational speed relative to the front propeller in response to changes in the front propeller's wake and in this way maintains optimum propulsive efficiency over a wide range of operating conditions. Furthermore, precise matching of front and rear propeller parameters for a given application is no longer required.

U.S. Pat. No. 5,791,950 discloses an improved twin propeller marine propulsion unit. A vertical drive shaft is journaled in the lower gearcase and drives a pair of bevel gears. A pair of concentric propeller shafts are mounted in the lower torpedo section of the gearcase and each shaft carries a propeller. A slidable clutch is movable between a neutral, a forward, and a reverse position and serves to operably connect the outer propeller shaft with one of the bevel gears when the clutch is moved to the forward drive position. A gear is mounted for sliding movement in unison with the clutch and acts to operably engage the inner propeller shaft with the second bevel gear when the clutch is in the forward drive position so that both propellers are driven in opposite directions to provide forward motion for the watercraft. The propulsion unit also includes a dual cooling water pick-up system in which seawater is drawn to the water pump both through a series of vertical inlet ports in the gearcase and through a plurality of inlet holes that are located in the forward end of the lower torpedo section. Exhaust gas from the engine is discharged through the rear end of the lower housing section through axial passages in the hub of the forward propeller and then across the outer surface of the rear propeller.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a system for suspending a lubricant in a marine propulsion device having a gearcase, the gearcase defining a gearset cavity for containing a propeller shaft gearset rotated by a driveshaft. The system includes a pump device configured to pump the lubricant away from the gearset cavity, and a reservoir located away from the gearset cavity and configured to receive the lubricant from the pump device. An input passage conveys the lubricant from the pump device to the reservoir, and an output passage conveys the lubricant from the reservoir to the gearset cavity. The reservoir is configured to retain at least 15% of the lubricant circulating between the gearset cavity and the reservoir.

Another embodiment generally relates to a system for suspending a lubricant in a marine propulsion device having a gearcase, the gearcase defining a gearset cavity for containing a propeller shaft gearset rotated by a driveshaft. The system include an oil scraper positioned in the gearset cavity such that the lubricant disposed on the propeller shaft gearset is diverted therefrom, and a reservoir located above the gearset cavity and configured to contain the lubricant diverted from the propeller shaft gearcase therein. An input passage conveys the lubricant diverted by the oil scraper to the reservoir, and an output passage conveys the lubricant from the reservoir to the gearset cavity. Rotation of the propeller shaft gearset generates a pressure that forces the lubricant into the reservoir via the input passage.

Another embodiment generally relates to a method for suspending a lubricant in a marine propulsion device having a gearcase, the gearcase defining a gearset cavity for containing a propeller shaft gearset rotated by a driveshaft. The method includes pumping the lubricant away from the gearset cavity with a pumping device, and positioning a reservoir above the gearset cavity, where the reservoir is configured to contain the lubricant pumped by the pumping device. The method includes fluidly connecting an input passage for conveying the lubricant from the pumping device to the reservoir, and fluidly connecting an output passage for the lubricant to drain from the reservoir into the gearset cavity. The reservoir is configured to retain at least 15% of the lubricant circulating between the gearset cavity and the reservoir.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

This written description uses examples to disclose embodiments of the present disclosure and also to enable any person skilled in the art to practice or make and use the same. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Figure 1:
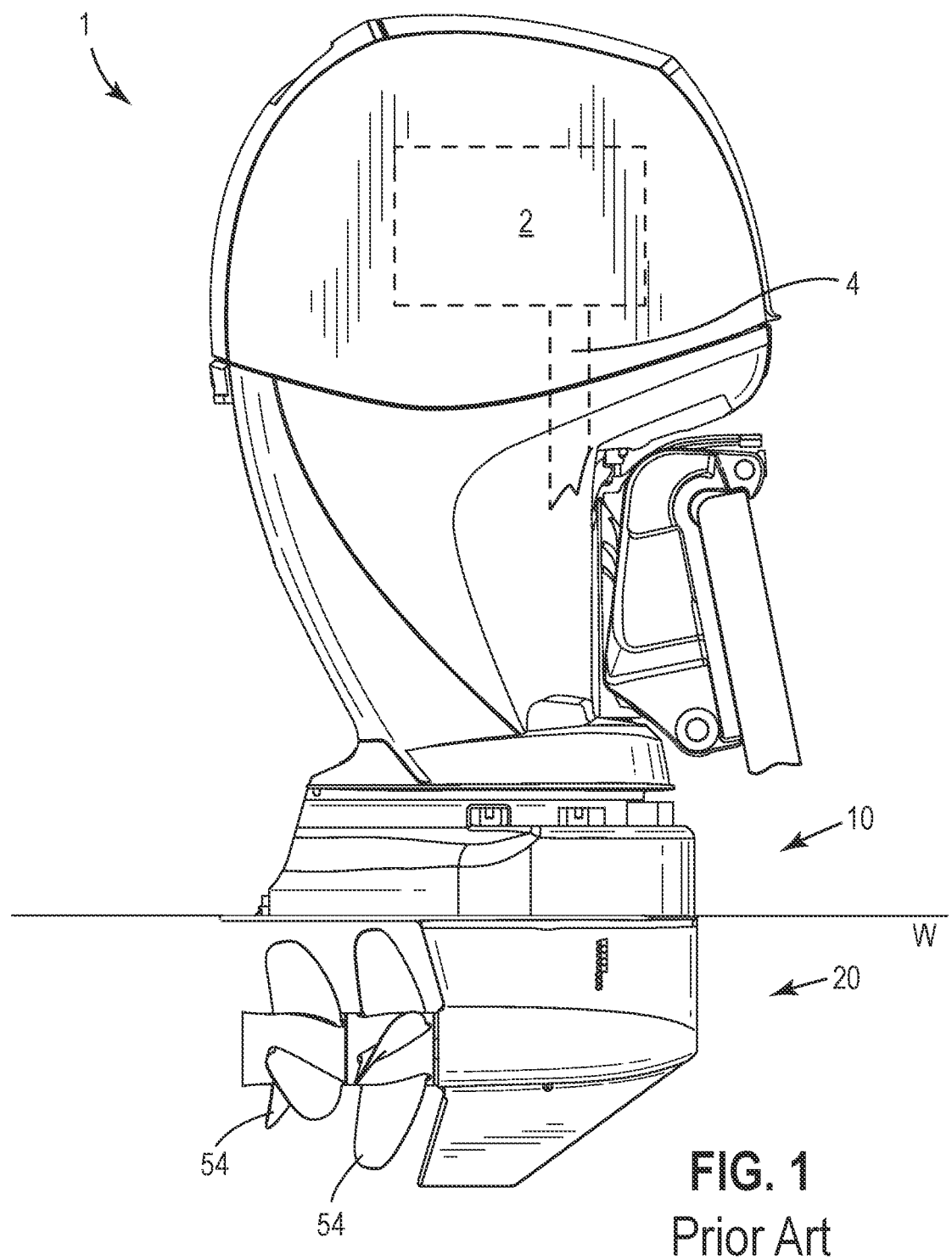
FIG. 1 is a side view of a propulsion device as presently known in the art.

FIG. 1 depicts an exemplary propulsion device 1 as presently known in the art, shown here to be an outboard motor. The propulsion device 1 includes an engine 2 that rotates a driveshaft 4 in the customary manner. The driveshaft 4 is operatively coupled to rotate one or more propeller shafts 50 via a propeller shaft gearset 40 (both shown in FIG. 3), which are discussed further below. The propulsion device 1 includes a housing 10 and a gearcase 20. The gearcase 20 defines a gearset cavity 24 that contains the propeller shafts 50 and propeller shaft gearset 40 therein. The propeller shafts 50 then rotate the propellers 54 in the customary manner.

Figure 2:
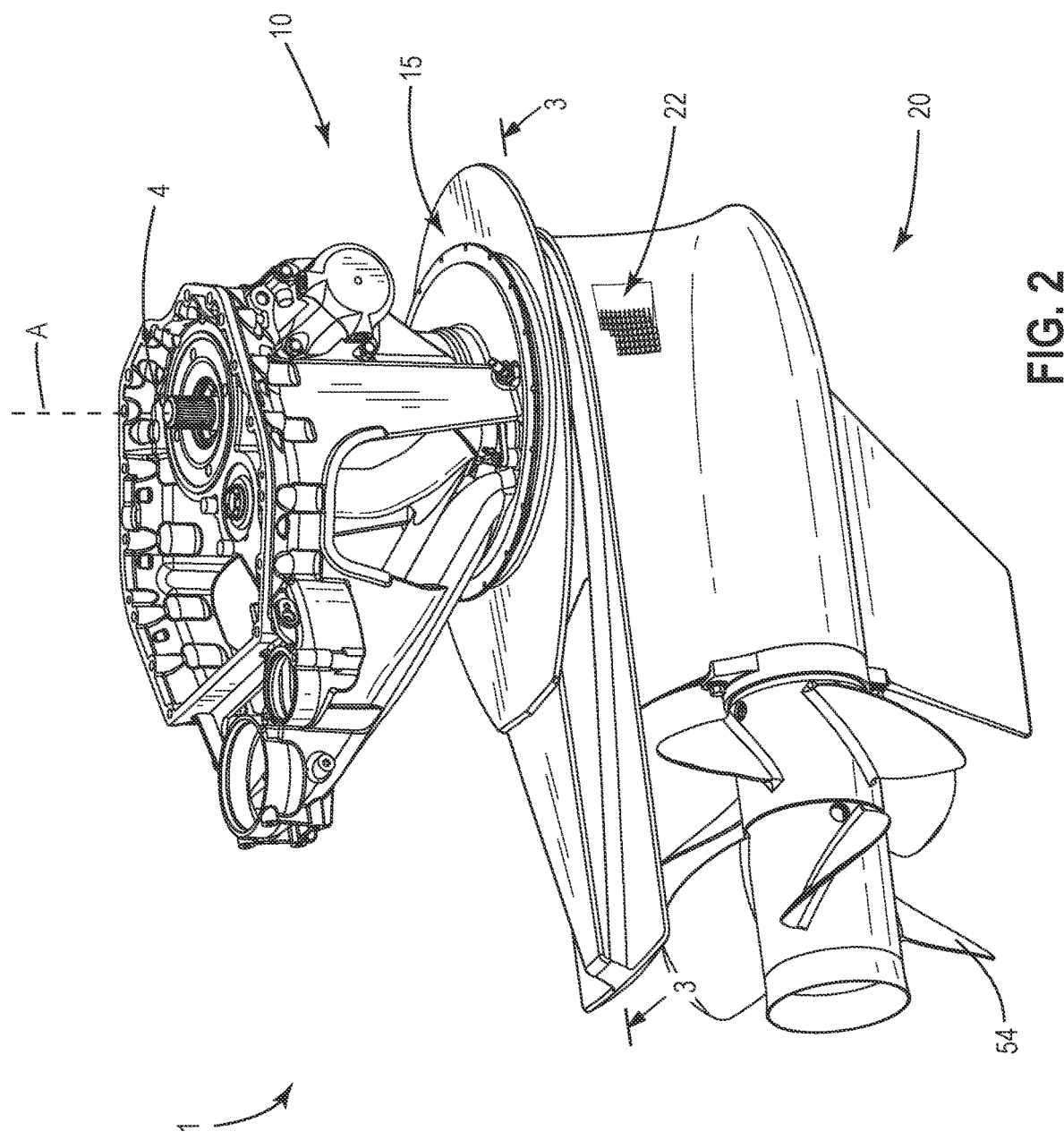
FIG. 2 is an isometric rear view of a portion of a propulsion device according to the present disclosure.

FIG. 2 depicts a system 3 for lubricating an exemplary propulsion device 1 according to the present disclosure. In the embodiment shown, the driveshaft 4 rotates about an axis of rotation A, which is configured to be rotated by the engine 2 as previously discussed. The driveshaft 4 transmits this rotation downwardly through the housing 10 and into the gearcase 20. The housing 10 and the gearcase 20 meet at a transition 15, which will be discussed further below. In the particular embodiment shown, the gearcase 20 is pivotally coupled to the housing 10 via a kingpin 30 such that the gearcase 20 is steerable about the axis of rotation A relative to the housing 10 to navigate a marine vessel through a body of water W (FIG. 1). A water inlet 22 is further provided within the gearcase 20 for cooling the engine 2 and other components in the manner known in the art.

Figure 3:
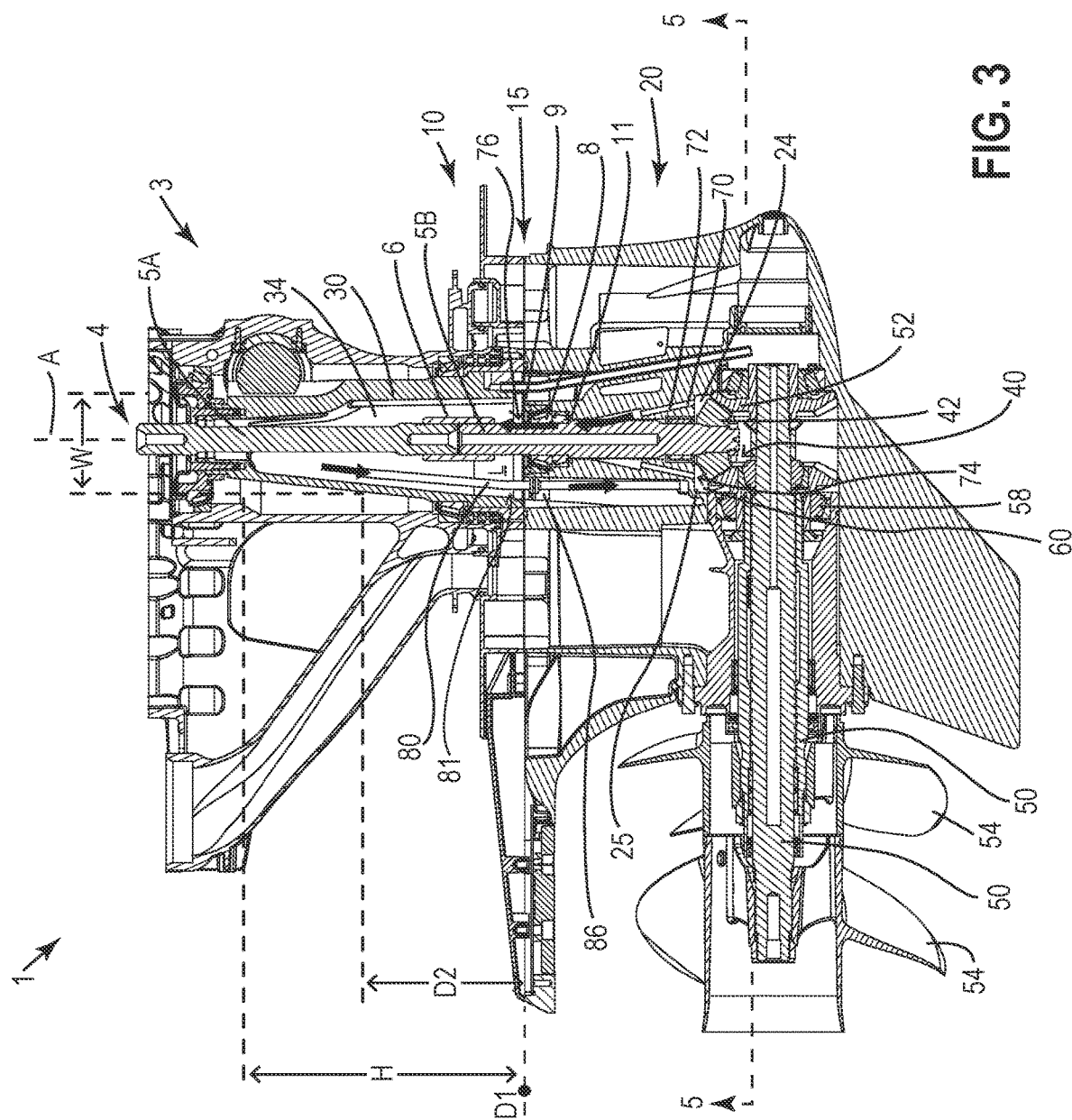
FIG. 3 is a sectional side view taken along the line 3-3 in FIG. 2.
Figure 4:
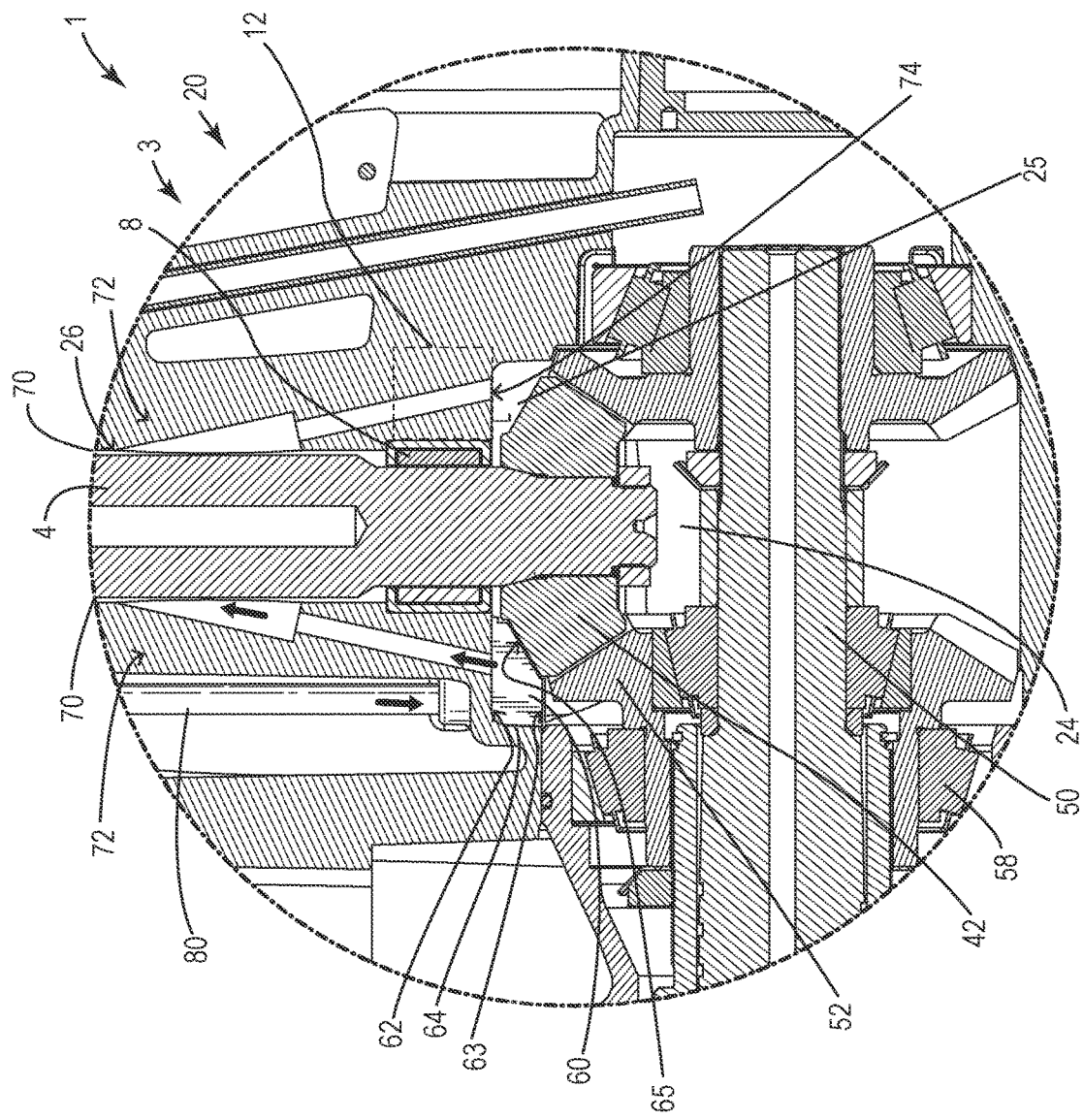
FIG. 4 is a side view close up taken from FIG. 3.

FIGS. 3-4 depict the presently disclosed system for lubricating components within a marine propulsion device having a gearcase 20, while concurrently minimizing losses due to windage. In particular, windage losses are minimized by limiting the portion of the lubricant that surrounds or resists movements of components (such as the propeller gearset 40), which nonetheless providing sufficient lubricant volume overall to provide the necessary lubrication and cooling of the lubricant for the marine propulsion device. As is discussed further below, this may be accomplished in part by providing a reservoir separate and apart from a region to minimize windage losses (i.e., the gearset cavity 24 shown in FIGS. 3-4) to hold a portion of the lubricant. In certain embodiments, the reservoir is configured to retain 15% of the overall lubricant circulating through the system. However, the present inventors have identified cases in which retaining 40%, 50%, 66%, or even larger portions of the overall lubricant is advantageous to the performance of the marine propulsion device.

While the present disclosure principally discusses lubrication for the propeller shaft gearset 40, it will be recognized that lubrication may also be provided to support bearings (i.e., bearings 8, bearings 58), seals, splines, and/or shifting components, for example. The driveshaft 4 is rotated by the engine 2 as previously discussed. In the embodiment shown, the driveshaft 4 is comprised of an upper driveshaft 5A and a lower driveshaft 5B operatively that are coupled together with a coupler 6. The driveshaft 4 extends through the housing 10 and into the gearcase 20 through the transition 15 defined therebetween.

The driveshaft 4 is further coupled at a lower end to a driveshaft gear 42, shown here as a bevel gear, which engages with the propeller shaft gears 52 coupled to the one or more propeller shafts 50 supported by bearings 58 in a manner known in the art. The driveshaft 4 thereby transmits rotation to the propeller shafts 50 via engagement between the driveshaft gear 42 and the propeller shaft gears 52, which together are referred to as the propeller shaft gearset 40. In the embodiment shown, the propeller shafts 50 comprise two separate counter-rotating propeller shafts that transmit rotation to two correspondingly counter-rotating propellers 54. However, it will be recognized that the present disclosure also relates to configurations in which only one propeller shaft 50, one propeller 54, and/or different configurations of propeller shaft gearsets 40 are employed.

The present inventors have identified an unmet problem experienced within lubrication systems of marine propulsion devices presently known in the art, including both outboards and stern drives, for example. In part, there are conflicting interests with respect to lubrication of the propeller shaft gearset 40, and particularly the volume of lubricant L contained therewith. For example, a sufficient volume of lubricant L must be provided in communication with the propeller shaft gearset 40 to ensure proper cooling and lubrication thereof. However, the present inventors have also identified that an excessive volume of lubricant L surrounding the propeller shaft gearset 40 causes significant losses due to windage, created by additional drag of the components. This results in a reduction of effective horsepower output of the engine 2 acting as the propellers 54. In many cases, the propulsion device 1 must be configured to operate at exceptionally slow driveshaft 4 speeds, as well as in high speed operation.

Moreover, it is often required to monitor or otherwise report a fill level of the lubricant L. However, it is often infeasible to position a sensor 11 within the gearcase 20, thereby requiring the sensor 11 to be located above the gearcase 20, such as within the housing 10. Positioning the sensor 11 above the gearcase 20 necessarily requires higher levels of the lubricant L such that the sensor 11 is positioned within its volume. While this additional volume of lubricant L may not be a problem during low speed operation (forcing the bearings 8 of the driveshaft 4 to be flooded with oil at speeds in which pumping the lubricant L up to the bearings 8 may not otherwise be feasible or practical). However, this additional volume of the lubricant L is undesirable in high speed operation, which reduces gearcase 20 efficiency (and subsequent boat performance), as well as reducing gearcase 20 durability due to the higher internal gearcase 20 temperatures.

Accordingly, the present inventors have identified a need for controlling the volume of lubricant L in contact with the propeller shaft gearset 40, while also providing sufficient lubricant L overall to provide the necessary cooling lubricant L in use. As discussed further below, this is accomplished in part by "suspending" the lubricant L within the system 3, providing a significant reduction in non-loaded windage losses (the parasitic drag discussed above) and a significant reduction in bulk gearcase 20 lubricant L temperature.

As shown in FIGS. 3 and 4, the presently disclosed system 3 is configured to suspend a portion of the lubricant L available for lubricating the propeller shaft gearset 40 within a reservoir 34. In the embodiment shown, which particularly discloses a propulsion device 1 having a steerable gearcase 20, this is accomplished by utilizing a volume of space available within the kingpin 30 that rotatably couples the gearcase 20 and the housing 10 containing the driveshaft 4. In particular, the kingpin 30 defines the reservoir 34, which is also referred to as a kingpin cavity. However, it should be recognized that the reservoir 34 may also be defined elsewhere or provided within a separate structure other than within the kingpin 30, whether or not the propulsion device 1 is outfitted with a kingpin 30 at all (i.e., in propulsion devices not having steerable gearcases 20). The reservoir 34 has a height H and a width W, whereby the height H may vary over the width W and vice versa. An oil scraper 60 having an upper edge 62, lower edge 63, distal edge 64, and scraping edge 65 is positioned within a scraper cavity 25 within the gearset cavity 24. In the embodiment shown, the upper edge 62 is approximately parallel to the lower edge 63, which are each approximately perpendicular to the distal edge 64. The scraping edge 65 is contoured to closely match the shape of the propeller shaft gearset 40, as will be discussed further below, which in the present embodiment is at an approximately forty-five degree angle from the upper edge 62 and lower edge 63. However, it should be recognized that the scraping edge 65 need not be a straight line, but may incorporate curves and/or angular transitions to match the shape of the propeller shaft gearset 40. The upper edge 62, lower edge 63, and/or distal edge 64 may also be contoured and incorporate curves and/or angular transitions to match or provide clearance for, as the case may be, other elements adjacent thereto (such as the gearcase 20).

In certain embodiments, the oil scraper 60 is formed with the steerable gearcase 20 and is thus comprises of the same material (such as aluminum, for example). In other embodiments, the oil scraper 60 may be separately formed of plastic, metal, or another material and is fixed within the gearset cavity 24 such that the scraping edge 65 is positioned in close proximity to and faces the propeller shaft gearset 40. In particular, the scraping edge 65 is positioned in close proximity to and faces the driveshaft gear 42. In certain embodiments, the clearance between the scraping edge 65 of the oil scraper 60 and the propeller shaft gearset 40 is 0.020"-0.030". Fixation of the oil scraper 60 may be by adhesives, fasteners, tongue and groove or other joint configurations, and/or the like.

In operation, lubricant L is carried along the driveshaft gear 42 and the propeller shaft gear 52 to lubricate the propeller shaft gearset 40. In the presently disclosed system 3, the oil scraper 60 is positioned within the gearset cavity 24 such that a portion of the lubricant L disposed on the propeller shaft gearset 40 is scraped off or diverted from the propeller shaft gearset 40 by the oil scraper 60 due to the relatively low clearance therebetween. However, the system 3 is configured to leave enough lubricant L on the driveshaft gear 42 and/or propeller shaft gear 52 to nonetheless ensure proper lubrication between the components of the propeller shaft gearset 40.

The lubricant L diverted from the propeller shaft gearset 40 is then communicated via a relatively higher pressure created from rotation of the propeller shaft gearset 40 within this region of the gearset cavity 24 to an input passage 70 defined within the gearcase 20. The input passage 70 has an input inlet 74 that is located in close proximity to the oil scraper 60, whereby the input passage 70 conveys the lubricant L such that the input passage 70 conveys the lubricant L diverted from the propeller shaft gearset 40 upwardly. In the embodiment shown, two separate inlet segments 72 are shown: one on the forward side, and one on the aft side, of the gearcase 20. However, any number of inlet segments 72 may be employed surrounding the propeller shaft gearset 40.

As best shown in FIG. 4, the input passages 70 may convey the lubricant L inwardly toward a driveshaft bore 26 defined within the gearcase 20 that receives the driveshaft 4 while also conveying the lubricant L upwardly. The lubricant L then continues to travel upwardly within the driveshaft bore 26, passing through the transition 15 between the gearcase 20 and the housing 10, and into the reservoir 34 defined within the kingpin 30.

In this manner, lubricant L is diverted from the propeller shaft gearset 40 and conveyed by the input passage 70 upwardly into the reservoir 34, thereby reducing the volume of lubricant L within the system 3 surrounding the propeller shaft gearset 40. The input passage 70 delivers the lubricant L into the reservoir 34 via an input outlet 76 that is opposite the input inlet 74. In the embodiment shown in FIG. 3, the input outlet 76 is substantially level with the bottom of the reservoir 34 (in some cases formed by the transition 15), and thus delivers the lubricant L a negligible first distance D1 above the transition 15.

FIG. 3 also shows an output passage 80 for providing flow of the lubricant L back to the gearset cavity 24 to lubricate the propeller shaft gearset 40. In other words, the system 3 is configured such that the volume of lubricant L surrounding the propeller shaft gearset 40 is not the entirety of lubricant L throughout the entire system 3. This may be accomplished by positioning an outlet inlet 84 a certain height above the bottom of the reservoir 34 (discussed further below), and/or by metering the output passage 80 (i.e., by limiting the diameter thereof) to control the flow rate therethrough.

The output passage 80 has an output inlet 84 that is positioned a second distance D2 from the transition 15. By positioning the output passage 80 such that the output inlet 84 is above the input outlet 76, a known volume of lubricant L is suspended or retained within the reservoir 34 before being returned in a controlled manner back to the gearset cavity 24. In this manner, sufficient lubricant L is contained within the overall system 3 to provide the necessary cooling of components, but is controlled such that windage loss at the propeller shaft gearset 40 is minimized due to having an optimized volume of lubricant L therein.

In certain embodiments, such as is shown in FIG. 3, a weeping path 81 is provided to allow some of the lubricant L to drain from the reservoir 34 other than through the output inlet 84. The weeping path 81 may be defined within the output passage 80, or between the output passage 80 and the transition 15, for example. This weeping path 81 provides that all lubricant L can eventually drain from the reservoir 34 when the system 3 is not in operation to assist with oil changes and the like.

The weeping path 81 also provides for a second rate of drainage from the reservoir 34 when in use, which allows for further control of the volume of lubricant L in the gearset cavity 24 and elsewhere depending on engine 2 speed and consequent windage loss concerns. As stated above, it is desirable for the propeller shaft gearset 40 to be flooded with lubricant L when the engine 2 is operated at low speeds, since the effects due to windage are minimal. At low speeds, additional lubricant L is pumped up to the reservoir 34 at a low rate, which may be configured to be about the same rate as the lubricant L is drains via the weeping path 81. In contrast, at high speeds, lubricant L is pumped into the reservoir at a faster rate than drains from the weeping path 81. Consequently, the lubricant L fills up to the height of the output inlet 84 and much of the lubricant L drains via the output inlet 84. This provides for two separate rates of drainage from the reservoir 34 to accommodate the needs of the marine propulsion device.

In certain embodiments, such as shown in FIG. 4, a portion of the input passage 70 communicates the lubricant L with the driveshaft 4 to provide lubrication between the driveshaft 4 and the driveshaft bore 26, as well as bearings 8 (FIG. 3). However, sleeves and other mechanisms may be employed to otherwise isolate the driveshaft 4 from contact with the lubricant L within the input passage 70, for example.

In another embodiment, which is schematically shown in FIG. 4, a pump 12 is provided in communication with the input passage 70 to pump the lubricant L therethrough in the manner previously described, either supplementing or replacing the oil scraper 60 in this function. The pump 12 may rotate at a constant rate, or vary with engine speed, lubricant L temperature, and/or the like. Likewise, the pump 12 may be powered or may be mechanically driven in one of the manners known in the art.

Figure 5:
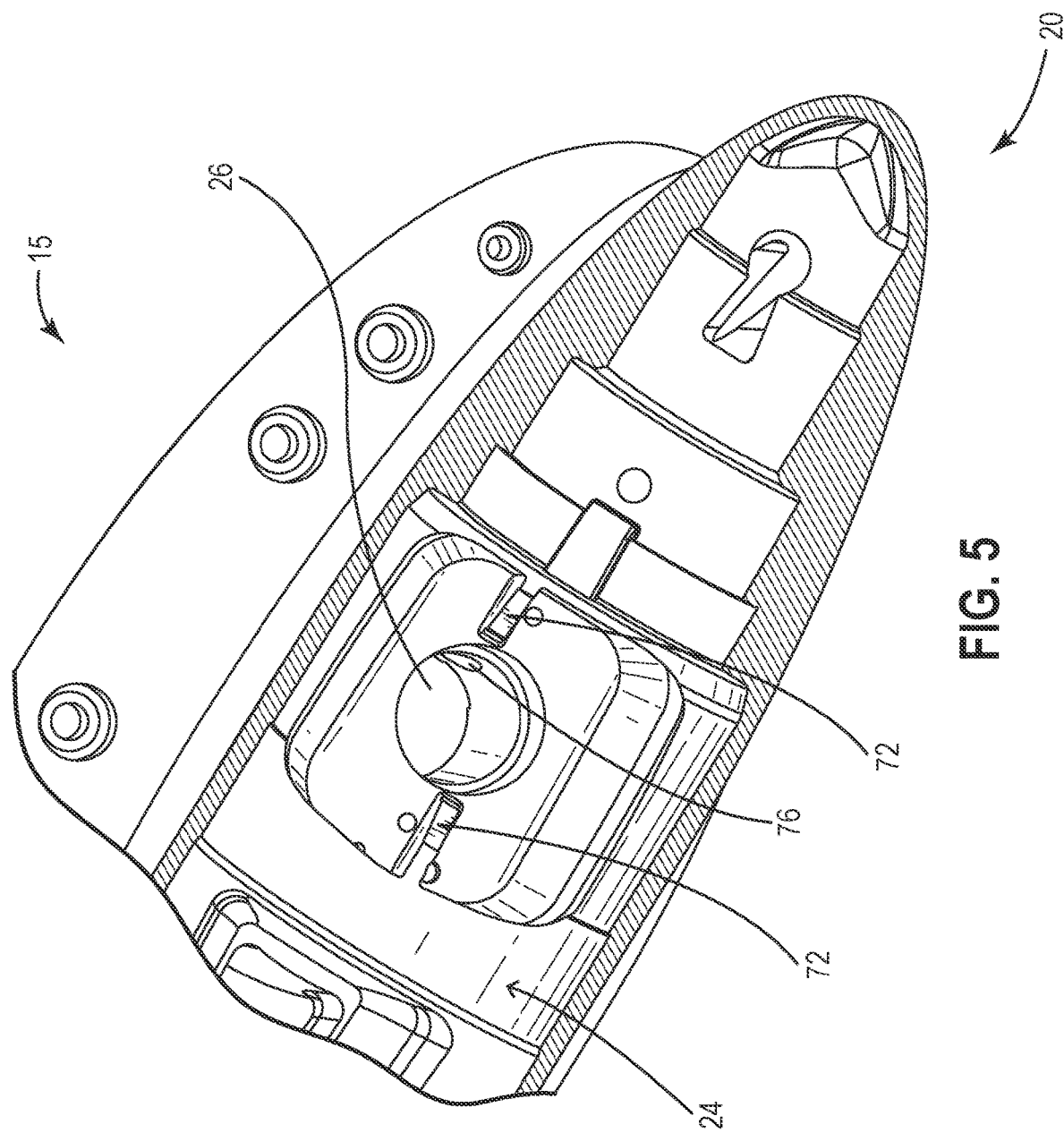
FIG. 5 is an isometric sectional view taken along the line 5-5 in FIG. 3.

FIG. 5 depicts a bottom-up view of the gearcase 20 taken along the line 5-5 in FIG. 3. The embodiment shown depicts the driveshaft bore 26, as well as two inlet segments 72 that convey the lubricant L from the input inlets 74 (FIGS. 3 and 4) upwardly and inwardly to the driveshaft bore 26 for communication with the reservoir 34. FIG. 5 further depicts one embodiment for configuring the input outlets 76, which are shown to be defined within the gearcase 20 such that the lubricant L is conveyed outwardly from the driveshaft bore 26 into the reservoir 34, for example at a negligible first distance D1 from the transition 15. However, it should be recognized that the first distance D1 between the input outlet 76 and the transition 15 may also be non-zero, but in most cases less than a second distance D2 between the output inlet 84 and the transition 15. As discussed above, it should be further recognized that the metering of lubricant L from the reservoir 34 downwardly to the gearset cavity 24 may be controlled additionally or alternatively by configuring the relative diameters or overall volumes delivered by the input passages 70 relative to the output passages 80. In certain embodiments, the diameters of the input passages 70 and the output passages are equal to each other.

Figure 6:
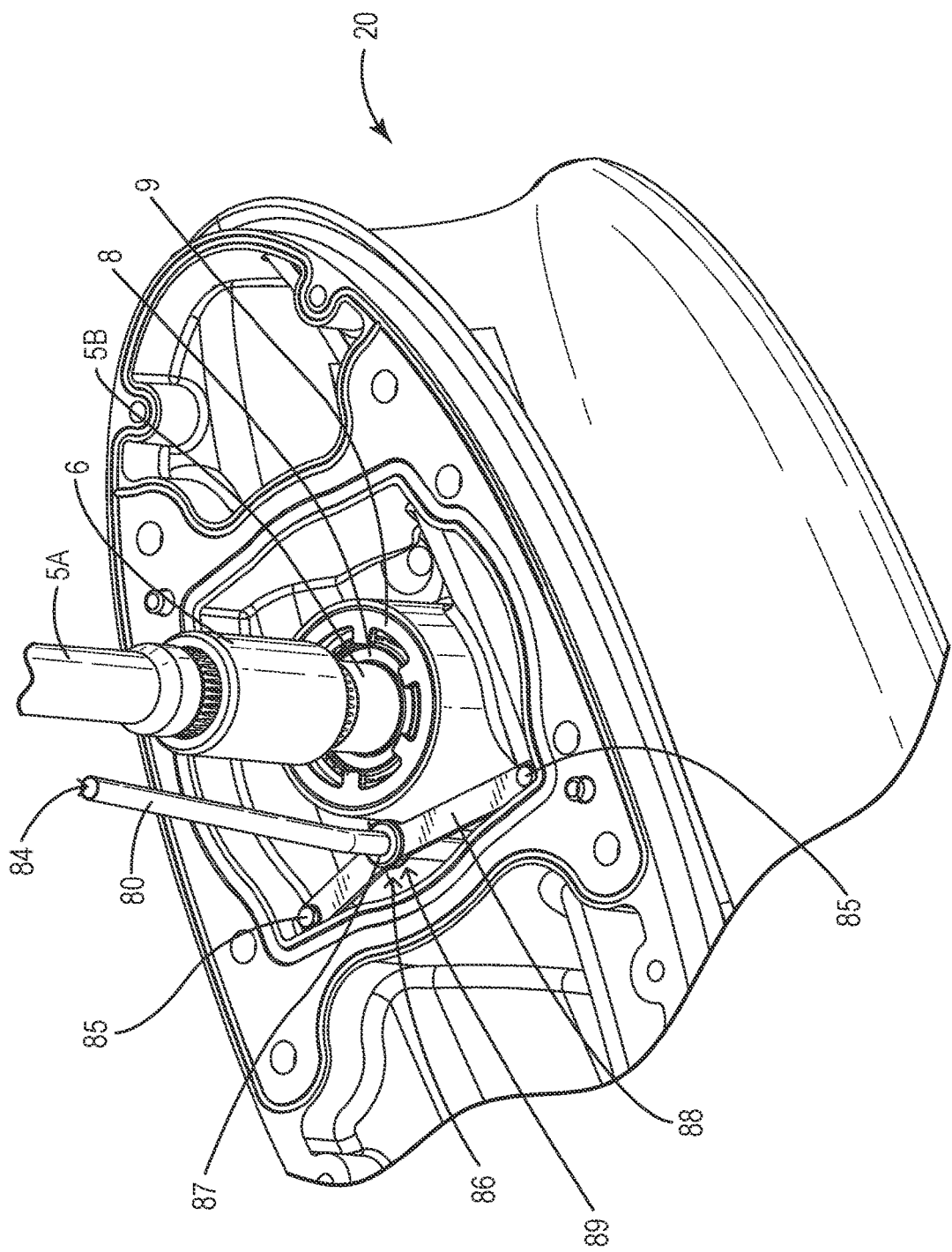
FIG. 6 is an isometric top view of an exemplary embodiment according to the present disclosure.

FIG. 6 discloses one embodiment of the presently disclosed system 3, and particularly the mechanisms for supporting the output passage 80. In the embodiment shown, the output passage 80 is fixed in the forward/aft and port/starboard directions by a support structure 88, shown here as an elongated member defining an opening for receiving the conduit for the output passage 80 therein. The support structure may be comprised of metal or plastic, for example. The support structure 88 is fixed to the gearcase 20 via fasteners 85, such as bolts, screws, rivets, adhesives, and/or the like. As also shown in FIG. 3, the output passage 80 further includes a retention feature 86 to prevent movement of the output passage 80 in the up/down direction. In the embodiment shown, the retention feature 86 is a grommet 87 received within the opening 89 defined in the support structure 88, whereby the grommet 87 also receives the conduit for the output passage 80 therein. In this example, the grommet 87 is formed of a high-friction material such as rubber, for example, to prevent movement of the conduit forming the output passage 80 relative to the support structure 88. In alternative embodiments, swages or other features may be provided in addition, or in the alternative, to the grommet 87 to retain the output passage 80 within the support structure 88. Additional examples of retention features 86 include clamps, adhesives, and/or the like.

As also shown in FIGS. 3 and 6, the driveshaft 4 is rotationally supported by bearings 8 contained within the gearcase 20 by a heavy duty spanner nut 9, for example. The present inventors have identified that positioning the input passage 70 to coincide with the driveshaft bore 26 is advantageous in that the clearance is already available for this purpose, avoiding the need to provide additional passages.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for suspending a lubricant in a marine propulsion device having a gearcase, the gearcase defining a gearset cavity for containing a propeller shaft gearset rotated by a driveshaft, the system comprising:
   a pump device configured to pump the lubricant away from the gearset cavity;
   a reservoir located away from the gearset cavity and configured to receive the lubricant from the pump device;
   an input passage that conveys the lubricant from the pump device to the reservoir; and
   an output passage that conveys the lubricant from the reservoir to the gearset cavity;
   wherein the reservoir is configured to retain a portion of the lubricant circulating between the gearset cavity and the reservoir to reduce a remaining portion of the lubricant in the gearset cavity to thereby reduce drag for the propeller shaft gearset rotating therein.

2. The system according to claim 1, wherein the pump device is an oil scraper positioned in the gearset cavity such that the lubricant disposed on the propeller shaft gearset is diverted therefrom, wherein rotation of the propeller shaft gearset generates a pressure that forces the lubricant into the reservoir via the input passage.

3. The system according to claim 2, wherein the oil scraper comprises two or more oil scrapers, and wherein the input passage comprises two or more inlet segments that receive the lubricant from the two or more oil scrapers.

4. The system according to claim 3, wherein the two or more oil scrapers are formed within the gearcase, and wherein the two or more inlet segments converge such that the lubricant combines prior to entering the reservoir.

5. The system according to claim 1, wherein a portion of the input passage communicates with the driveshaft such that the lubricant contacts the driveshaft.

6. The system according to claim 1, wherein the lubricant drains from the reservoir via gravity.

7. The system according to claim 1, where the input passage has an input inlet for receiving the lubricant diverted from the propeller shaft gearset, and wherein the input passage angles inwardly towards the driveshaft downstream of the input inlet.

8. The system according to claim 1, wherein a transition is defined between the gearcase and a housing that contains the driveshaft, and wherein the output passage extends upwardly away from the transition into the reservoir.

9. The system according to claim 8, wherein the reservoir is defined within a kingpin that pivotally couple the gearcase to the housing, wherein the reservoir has a height above the transition, and wherein the output passage extends into the kingpin at least half of the height of the reservoir.

10. The system according to claim 8, wherein the reservoir has a width, wherein the output passage has an output inlet for receiving the lubricant from the reservoir, and wherein the width of the reservoir is greater at the transition than the width at a height in which the output inlet extends within reservoir.

11. The system according to claim 1, wherein the gearcase is pivotally coupled via a kingpin to a housing that contains the driveshaft such that the gearcase is steerable relative to the housing.

12. The system according to claim 1, wherein the propeller shaft gearset is configured to rotate a plurality of propeller shafts via a plurality of propellers coupled thereto to propel a marine vessel through a body of water.

13. The system according to claim 1, further comprising a housing that contains the driveshaft and is coupled to the gearcase, wherein a transition is defined between the gearcase and the housing, and wherein the input passage extends through the transition a first distance from the driveshaft and the output passage extends through the transition a second distance from the driveshaft that is greater than the first distance.

14. The system according to claim 1, further comprising a housing that contains the driveshaft and is coupled to the gearcase, wherein a transition is defined between the gearcase and the housing, and wherein the reservoir is located entirely above the transition.

15. A system for suspending a lubricant in a marine propulsion device having a gearcase, the gearcase defining a gearset cavity for containing a propeller shaft gearset rotated by a driveshaft, the system comprising:
  an oil scraper positioned in the gearset cavity such that the lubricant disposed on the propeller shaft gearset is diverted therefrom;
  a reservoir located away from the gearset cavity and configured to contain the lubricant diverted from the propeller shaft gearcase therein;
  an input passage that conveys the lubricant diverted by the oil scraper to the reservoir; and
  an output passage that conveys the lubricant from the reservoir to the gearset cavity;
  wherein rotation of the propeller shaft gearset generates a pressure that forces the lubricant into the reservoir via the input passage.

16. The system according to claim 15, wherein the gearcase is pivotally coupled via a kingpin to a housing, wherein the reservoir is defined within the kingpin, wherein a transition is defined between the gearcase and the housing, and wherein the output passage extends upwardly away from the transition into the reservoir within the kingpin.

17. A method for suspending a lubricant in a marine propulsion device having a gearcase, the gearcase defining a gearset cavity for containing a propeller shaft gearset rotated by a driveshaft, the method comprising:
  pumping the lubricant away from the gearset cavity with a pumping device;
  positioning a reservoir at least as high as the propeller shaft gearset, wherein the reservoir is configured to contain the lubricant pumped by the pumping device;
  fluidly connecting an input passage for conveying the lubricant from the pumping device to the reservoir; and
  fluidly connecting an output passage for the lubricant to drain from the reservoir into the gearset cavity;
  wherein the reservoir is configured to retain a portion of the lubricant circulating between the gearset cavity and the reservoir to reduce a remaining portion of the lubricant in the gearset cavity to thereby reduce drag for the propeller shaft gearset rotating therein.

18. The method according to claim 17, wherein the output passage defines an output inlet, further comprising a weeping path for draining the lubricant from the reservoir to the gearset cavity other than via the output inlet in the output passage.

19. The method according to claim 17, wherein the driveshaft is contained within a housing, and wherein a transition is defined between the gearcase and the housing, further comprising positioning the output passage such that an output inlet for receiving the lubricant therein extends above the transition into the reservoir.

20. The method according to claim 19, wherein the reservoir is defined within a kingpin that pivotally couples the housing and the gearcase, and wherein the reservoir has a height above the transition, further comprising positioning the output inlet to extend into the kingpin at least half of the height of the reservoir such that a volume of the lubricant inside the reservoir does not drain via the output passage.

\* \* \* \* \*